United States Patent
Aidun

(10) Patent No.: US 7,577,868 B2
(45) Date of Patent: Aug. 18, 2009

(54) NO DATA LOSS IT DISASTER RECOVERY OVER EXTENDED DISTANCES

(75) Inventor: Mehrdad Aidun, Oak Hill, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 116 days.

(21) Appl. No.: 11/534,546

(22) Filed: Sep. 22, 2006

(65) Prior Publication Data

US 2007/0079171 A1    Apr. 5, 2007

Related U.S. Application Data

(60) Provisional application No. 60/722,369, filed on Sep. 30, 2005.

(51) Int. Cl.
*G06F 11/00* (2006.01)
(52) U.S. Cl. ........................ 714/6; 714/5; 714/7; 714/8; 714/42
(58) Field of Classification Search .................... 714/5, 714/6, 7, 8, 42
See application file for complete search history.

(56) References Cited

U.S. PATENT DOCUMENTS

| 5,592,618 | A  | 1/1997  | Micka et al.   |
|-----------|----|---------|----------------|
| 5,619,644 | A  | 4/1997  | Crockett et al.|
| 5,742,792 | A  | 4/1998  | Yanai et al.   |
| 5,870,537 | A  | 2/1999  | Kern et al.    |
| 6,044,444 | A  | 3/2000  | Ofek           |
| 6,327,671 | B1 | 12/2001 | Menon          |
| 6,389,552 | B1 | 5/2002  | Hamilton et al.|
| 6,601,187 | B1 | 7/2003  | Sicola et al.  |
| 6,643,795 | B1 | 11/2003 | Sicola et al.  |
| 6,658,540 | B1 | 12/2003 | Sicola et al.  |
| 6,658,590 | B1 | 12/2003 | Sicola et al.  |

(Continued)

OTHER PUBLICATIONS

Yi-Chen, Lan. A Framework for an Organization's Transition to Globalization—Investigation of IT Issues. Idea Group Inc. 2003.

*Primary Examiner*—Michael C Maskulinski
*Assistant Examiner*—Joseph D Manoskey
(74) *Attorney, Agent, or Firm*—Marsh Fischmann & Breyfogle LLP

(57) ABSTRACT

Systems and methods operating over extended distances provide for recovery of data and operational continuity of computer applications accessing data within an information technology system if an event occurs effecting access to the data. In one embodiment, an extended distance data recovery system (100) includes first, second and third data storage devices (112, 122, 132) located at respective first, second and third sites (110, 120, 130). The second and third sites (120, 130) are remotely located from the first site (110) with the second site (120) being nearby the first site (110). The first data storage device (112) has data (116) stored thereon. A computer executable control process (150) directs synchronous replication of the data (116), either at the storage level or at the application level, onto the second data storage device (122). The control process (150) also directs asynchronous replication of the data (116) from the second data storage device (122) onto the third data storage device (132) and coordinates among the three sites (110, 120, 130) the state of application servers, storage replication, network address changes, and other prerequisite aspects of the IT infrastructure required to allow the application servers to successfully start at the disaster recovery site.

29 Claims, 3 Drawing Sheets

U.S. PATENT DOCUMENTS

| | | |
|---|---|---|
| 6,779,073 B2 | 8/2004 | McLaughlin et al. |
| 7,370,228 B2 * | 5/2008 | Takahashi et al. .............. 714/6 |
| 2003/0018927 A1 | 1/2003 | Gadir et al. |
| 2003/0074600 A1 | 4/2003 | Tamatsu |
| 2003/0188218 A1 * | 10/2003 | Lubbers et al. ................ 714/5 |
| 2003/0188233 A1 | 10/2003 | Lubbers et al. |
| 2004/0034808 A1 * | 2/2004 | Day et al. ..................... 714/6 |
| 2004/0039888 A1 | 2/2004 | LeCrone et al. |
| 2004/0044865 A1 | 3/2004 | Sicola et al. |
| 2004/0153708 A1 | 8/2004 | Joshi et al. |
| 2004/0243650 A1 | 12/2004 | McCrory et al. |
| 2005/0015657 A1 * | 1/2005 | Sugiura et al. ................ 714/6 |
| 2005/0198452 A1 | 9/2005 | Watanabe |
| 2006/0047896 A1 * | 3/2006 | Nguyen et al. ................ 714/6 |

* cited by examiner

NO DATA LOSS IT DISASTER RECOVERY OVER EXTENDED DISTANCES

RELATED APPLICATION INFORMATION

This application claims priority from U.S. Provisional Application Ser. No. 60/722,369, entitled "NO DATA LOSS IT DISASTER RECOVERY OVER EXTENDED DISTANCES" filed on Sep. 30, 2005, which is incorporated by reference herein in its entirety.

FIELD OF THE INVENTION

The present invention relates generally to information technology systems, and more particularly to providing zero loss data protection and automated data recovery over extended distances.

BACKGROUND OF THE INVENTION

In an information technology (IT) system, it is often desirable to replicate data stored at one location at another location so that if an event occurs (e.g., an equipment failure, a power failure, a natural disaster, or a terrorist attack or other man-made event) that damages or otherwise renders the data at the first location inaccessible, the data can be recovered from the second location. The first location may be referred to as the primary site, the second location may be referred to as the disaster recovery site, and such an occurrence may be referred to as a disaster event. In order to provide sufficient assurance that the disaster recovery site will not be effected by the disaster event effecting the primary site, the disaster recovery site must be geographically separated from the primary site by a sufficient distance.

When replicating the data at the disaster recovery site, it may be desirable to do so in a synchronous manner such that when data is created, updated or stored at the primary site, such data is replicated to the disaster recovery site first and only after receiving an acknowledgement from the disaster recovery site of successful replication is the data write considered complete and successful at the primary site. This allows for no lost data if the primary site goes down. However, excessive roundtrip packet delays resulting from long distances and other network conditions between the primary and disaster recovery sites prevents synchronous replication of data from the primary site to the disaster recovery site. This difficulty is present regardless of whether data replication takes place in the storage, middleware, or application layer of the IT system. Excessive roundtrip packet delays can be unacceptable since operation of applications creating, updating or accessing the data will be delayed while awaiting confirmation that the data has been replicated at the disaster recovery site.

SUMMARY OF THE INVENTION

Accordingly, the present invention introduces an intermediary site between the primary site and the disaster recovery site. The primary site may be referred to herein as the first site, the intermediary site may be referred to herein as the nearby safe site or the second site, and the disaster recovery site may be referred to herein as the third site. The data is replicated from the primary site to the nearby safe site and then subsequently replicated from the nearby safe site to the disaster recovery site. The nearby safe site may be geographically remote from the primary site such that the nearby safe site would be expected to survive a disaster event effecting the primary site for some period of time after the primary site goes down, but not necessarily survive indefinitely. However, the nearby safe site is located close enough to the primary site such that synchronous data replication is possible between the primary site and the nearby safe site without encountering unacceptable roundtrip packet delays. The disaster recovery site is located far enough from the primary site that the disaster recovery site would be expected to survive the disaster event effecting the primary site. Because the data has already been replicated to the nearby safe site, asynchronous replication of the data from the nearby safe site to the disaster recovery site is acceptable.

The nearby safe site includes a number of desirable characteristics. For example, the nearby safe site is close enough to the primary site that roundtrip packet delays between the nearby safe site and the primary site would not be detrimental to the user software applications. A typical maximum distance is, for example, one-hundred kilometers or even two-hundred kilometers, although actual allowable distances depend on the actual network paths traversed, roundtrip packet delays encountered, and the software application sensitivity to roundtrip packet delays. The nearby safe site can be run in a "lights out" configuration with no regular staffing requirements and is expected to operate in case of chemical, biological, or nuclear contamination. The primary hardware components at the nearby safe site are data storage devices as well as application servers. The data on the data storage devices could optionally be encrypted allowing the nearby site and its assets to be shared among multiple customers at different physical locations. The nearby site is physically protected to continue to operate for a relatively short period of time after the primary site has sustained a disaster, thereby allowing for the completion of the data transfer that has been buffered at this site to the disaster recovery site.

According to one aspect of the present invention, an extended distance data recovery system includes a first data storage device located at a first site, a second data storage device located at a second site, a third data storage device located at a third site, and a computer executable control process coordinating all three sites. The first data storage device has data stored thereon. The second data storage device is communicatively connected with the first data storage device, and the third data storage device is communicatively connected with the second data storage device. The computer executable control process is executable to direct synchronous replication of the data onto the second data storage device. The control process is also executable to direct asynchronous replication of the data from the second data storage device onto the third data storage device. The computer executable control process is executable to coordinate among the three sites the state of application servers, storage replication, network address changes, and other prerequisite aspects of the IT infrastructure required to allow the application servers to successfully start at the disaster recovery site.

According to another aspect of the present invention, a method for providing recovery of data and operational continuity of computer applications accessing the data if an event occurs effecting access to the data on an information technology system is provided includes the step of storing the data at a first site. The data is synchronously replicated from the first site to a second site under the direction of a computer executable control process. The data is asynchronously replicated from the second site onto a third site, also under the direction of the control process. The operational status of the first site is monitored, and, upon occurrence of the event, location identifying information associated with the data is updated so that computer applications access the data from the second site and/or the third site.

These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Figure 1:
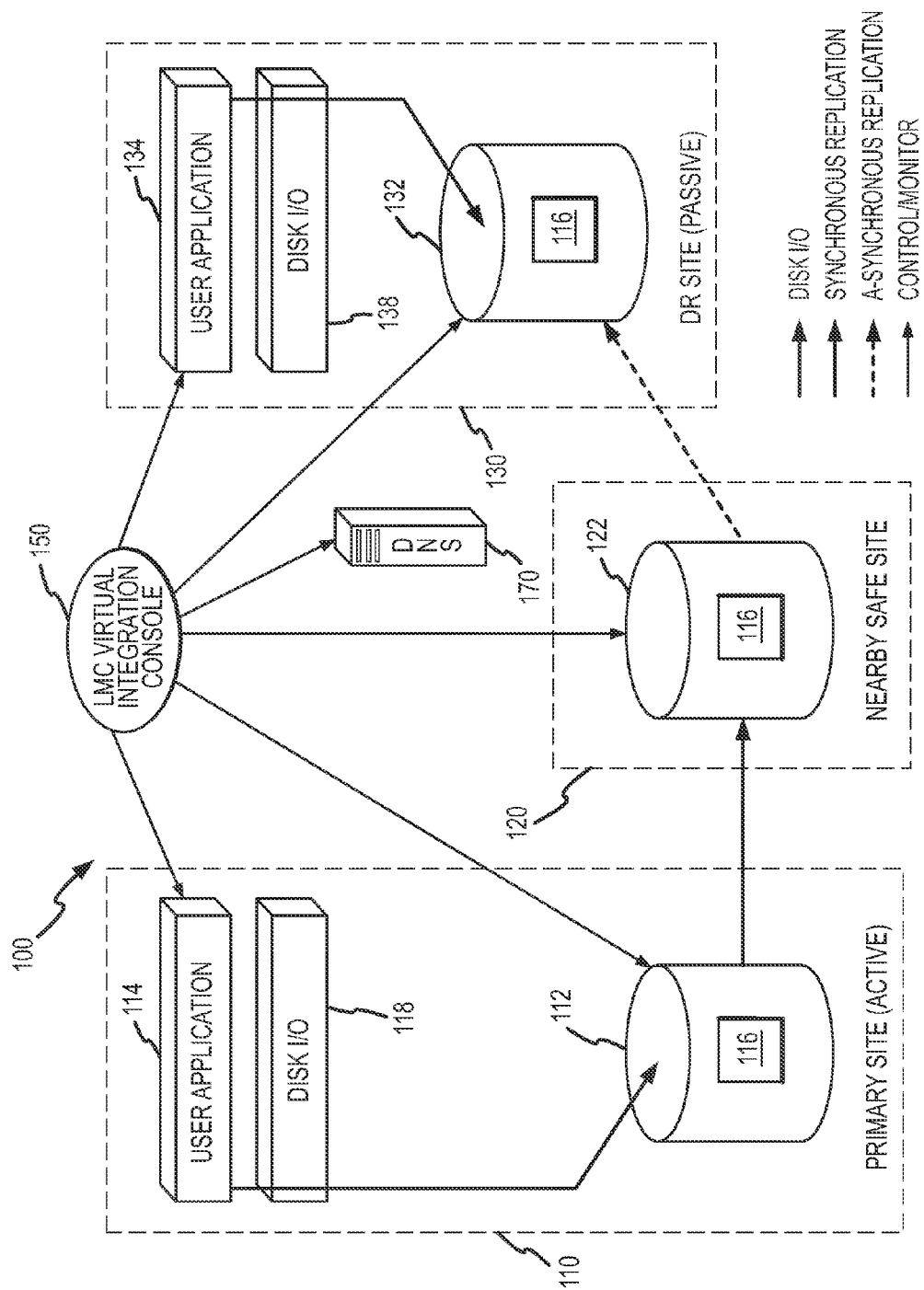
FIG. 1 is block diagram showing one embodiment of an extended distance data recovery system and the operation thereof in accordance with the present invention.

FIG. 1 illustrates one embodiment of an extended distance data recovery system 100. The system 100 includes a first data storage device 112 located at a first site 110 (the primary site 110), a second data storage device 122 located at a second site 120 (the nearby safe site 120 or intermediary site 120), and a third data storage device 132 located at a third site 130 (the disaster recovery site 130). The data storage devices 112, 122, 132 may, for example, be storage area network (SAN) devices each including a group of networked data storage devices (e.g., hard drives, CD or DVD drives, tape drives, flash memory devices, etc.). In other embodiments one or more of the first, second and third data storage devices 112, 122, 132 may, for example, be devices other than a storage area network device such as, for example, an individual hard drive. In this regard, data replication may need to be handled at a middleware or application layer level.

The primary site 110 may be geographically remote from the other sites such that in the event of an occurrence (e.g., an equipment failure, a power failure, a natural disaster, a terrorist attack or other man-made event) that causes loss of data access at the primary site 110, conditions effecting the operation of the primary site 110 may not necessarily effect the operations at the other two sites 120, 130. In this regard, the primary and nearby safe sites 110, 120 may, for example, be located in different buildings or in different towns as long as the primary and nearby safe sites 110, 120 are close enough to one another that a roundtrip packet delay time between the primary and nearby safe sites 110, 120 is within an acceptable range, and the primary and disaster recovery sites 110, 130 may, for example, be located in different towns, in different states, or even in different countries without regard to a roundtrip packet delay time therebetween. Regardless of the location of each site 110, 120, 130 relative to each other, they are enabled for communication therebetween via a suitable data network so that data created and/or stored at one site can be communicated to and replicated at another site. The data network may include various private and/or publicly shared wired and/or wireless portions.

One or more user applications 114 are executable by one or more computer processors or the like at the primary site 110. The user application(s) 114 create, update, and/or access data 116 that is stored, via a data input/output (I/O) interface 118 on the first data storage device 112.

The extended distance data recovery system 100 also includes a virtual integration console 150 (VIC 150). VIC 150 may also be referred to herein the control process 150 or control application 150. In one embodiment, VIC 150 is implemented in software executable by a computer processor, and there can be instances of VIC 150 executing on computer systems at each of the primary site 110, nearby safe site 120 and the disaster recovery site 130. Each instance of VIC 150 interfaces with the other instance of VIC 150, and in FIG. 1 all three instances of VIC 150 are represented as a single block.

VIC 150 directs the replication of the data 116 from the primary site 110 to the nearby safe site 120. In the present embodiment, VIC 150 directs replication of the data 116 from the primary site 110 to the nearby safe site 120 to take place in a synchronous manner at the storage level. In this regard, as packets of the data 116 are written to the first data storage device 112, the packets of the data 116 are also written to the second data storage device 122 and confirmation that the data replication operation has been completed is provided by the second data storage device 122 to the first data storage device 112 at the primary site 110. Although the roundtrip packet delay time between the primary and nearby safe sites 110, 120 depends on a number of factors including the type of communication network equipment used and overall network traffic, the primary site 110 and the nearby safe site 120 should, in general, be sufficiently proximate to one another such that the roundtrip packet delay time between the primary and nearby safe sites 110, 120 is not so long in duration that normal operation of the user application(s) is unacceptably impacted. While the geographic distance between the primary and nearby safe sites 110, 120 providing such an acceptable roundtrip packet delay time can vary greatly from one situation to another, geographic distances in the range of 100 kilometers up to 200 kilometers may be possible.

In addition to directing replication of the data 116 to the second data storage device 122 at the nearby safe site, VIC 150 also directs replication of the data 116 from the second data storage device 122 to the third data storage device 132 at the disaster recovery site 130. In the present embodiment, VIC 150 directs replication of the data 116 from the nearby safe site 120 to the disaster recovery site 130 to take place in an asynchronous manner. In this regard, the data 116 is replicated from the second data storage device 122 to the third data storage device 132 when resources at the nearby safe and disaster sites 120, 130 are available to copy the data 116. In this manner, the data 116 is initially replicated at the nearby safe site 120 and thereafter replicated to the disaster recovery site 130. The asynchronous data replication may occur periodically (e.g., every day, every hour, every minute, or as fast as the communication throughput between nearby safe site 120 and disaster recovery site 130 allow), or may occur in response to certain predefined events. The asynchronous data transfer protocol allows the primary site 110 to effectively be decoupled from the disaster recovery site 130. Thus, there is no need for the user application(s) 114 to wait for the data to be replicated to the disaster recovery site 130 before continuing with their operations. This configuration permits the disaster recovery site 130 to be located at a distance from the primary site 110 that is much greater than the distance between the nearby safe site 120 and the primary site 110. For example, the disaster recovery site 130 may be located in a different state or in a different country than the primary site 110. This provides even greater protection of the data 116 and continuity of the user application(s) 114 from the occurrence of a disaster event.

VIC 150 also monitors the operational status of the primary site 110. If a failure is detected and the application(s) 114 at the primary site 110 are not operating or are not able to access the data 116 from the first data storage device 112, VIC 150 makes the data 116 available from the nearby safe site 120 and/or the disaster recovery site 130 as appropriate. In this regard, if asynchronous replication of the data 116 from the second data storage device 122 to the third data storage device 132 is complete, then VIC 150 directs resources to access the data 116 from the third data storage device 132 instead of from the first data storage device 112. For example, one or more user application(s) 134 executable on computer systems located at the disaster recovery site 130 may access the data 116 from the third data storage device 132 via a data I/O interface 138. The disaster recovery site 130 user application (s) 134 may be the same as and/or provide the same functionality as the user application(s) 114 at the primary site 110 in order to provide continuity of operations formerly accomplished at the primary site 110. If, however, asynchronous replication of the data 116 from the second data storage device 122 to the third data storage device 132 has not been completed, then VIC 150 directs completion of the asynchronous data replication process. In the meantime, VIC 150 may direct resources to access the data 116 from the second data storage device 122 until the asynchronous data replication process is complete.

The user application(s) 134 at the disaster recovery site 130 do not operate while the primary site 110 user application(s) 114 operate, but when the primary site 110 goes down, VIC 150 activates the application(s) 134 at the disaster recovery site. In this regard, the primary site 110 user application(s) 114 are considered active, the disaster recovery site 130 user application(s) 134 are considered passive, and therefore the present embodiment may be referred to as an active/passive extended distance data recovery system 100.

Redirection of resources accessing the data 116 to the nearby safe site and/or disaster recovery site may be accomplished by VIC 150 in a number of manners. One manner is by providing updated IP address information associated with the data 116 to one or more domain name servers 170 (DNSs 170).

Figure 2:
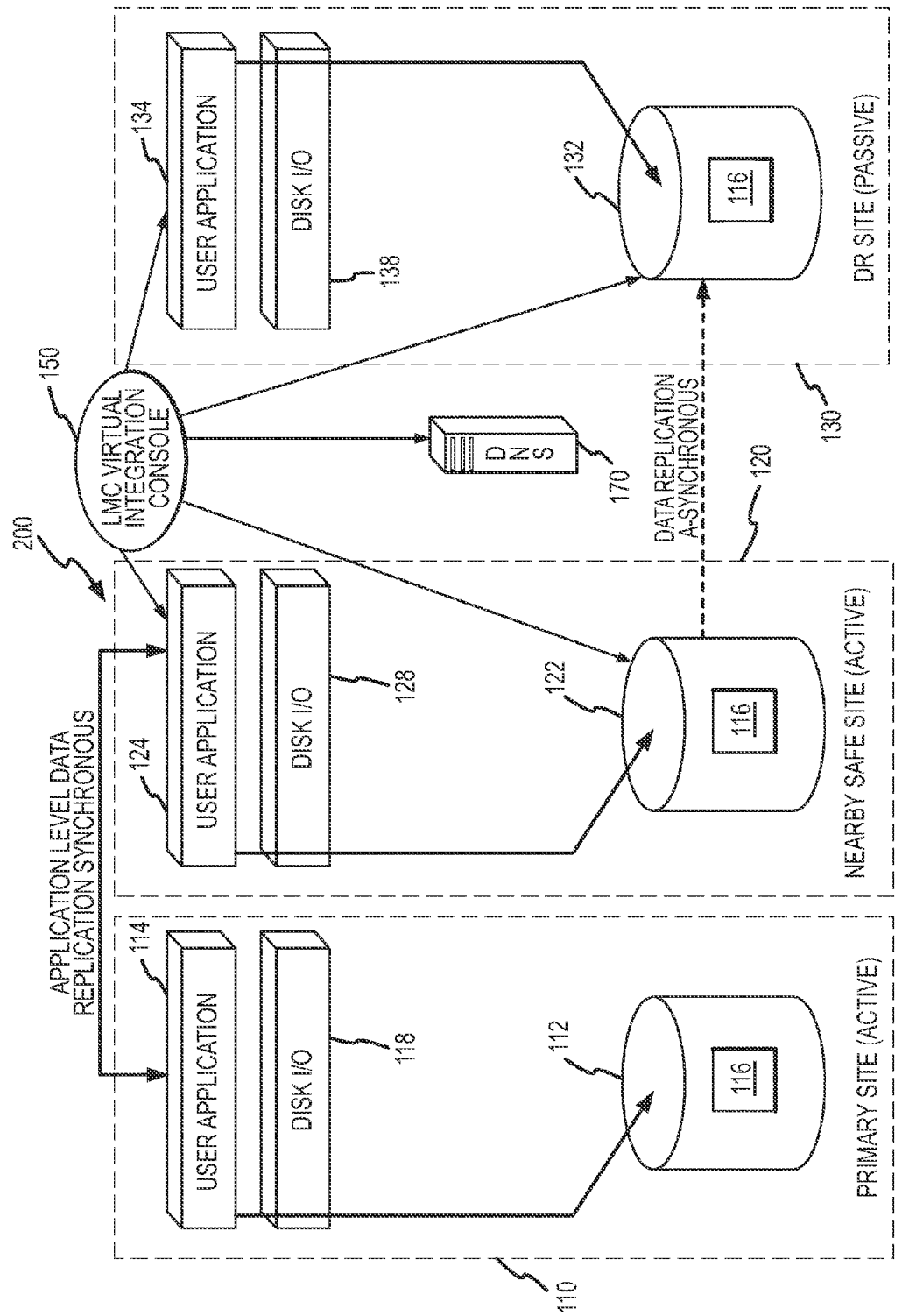
FIG. 2 is block diagram showing another embodiment of an extended distance data recovery system and the operation thereof in accordance with the present invention.

FIG. 2 shows another embodiment of an extended distance data recovery system 200. The extended distance data recovery system 200 of FIG. 2 includes a number of elements in common with the system 100 of FIG. 1, and corresponding elements are referenced using the same numerals. In the system 200 of FIG. 2, VIC 150 directs replication of the data 116 from the primary site 110 to the nearby safe site 120 to take place in a synchronous manner at the application level rather than the storage level. In this regard, as packets of the data 116 are created or updated by the user application(s) 114 at the primary site 110, the packets of the data 116 are also created and/or updated by user application(s) 124 executable by one or more computer processors at the nearby safe site 120. The user application(s) 124 at the nearby safe site 120 store the data 116 via a data I/O interface 128 on the second data storage device 122 thereby achieving replication of the data 116 at the nearby safe site 120. Additionally as packets of the data 116 are created or updated by the user application(s) 124 at the nearby safe site 120, the packets of the data 116 are also created and/or updated by user application(s) 114 executable by one or more computer processors at the primary site 110. The user application(s) 114 at the primary site 110 store the data 116 via a data I/O interface 118 on the primary data storage device 112 thereby achieving replication of the data 116 at the primary site 110. This is true since user application (s) 114 and 124 are both active simultaneously and potentially in a load balanced architecture.

The user application(s) 114 at the primary site 110 and the user application(s) 124 at the nearby safe site 120 may be corresponding instances of the same application(s). Since the user application(s) 124 are operating at the nearby safe site 120 simultaneously with the user application(s) 114 at the primary site 110, both the primary site 110 user application(s) 114 and the nearby safe site 120 user application(s) 124 are considered active and the present embodiment may be referred to as an active/active extended distance data recovery system 200.

As with the system 100 of FIG. 1, VIC 150 monitors operation of the primary site 110, and upon detection of a problem, redirects resources accessing the data 116 to the second data storage device 122 or the third data storage device 132 as appropriate depending upon whether the asynchronous data replication process between nearby safe site 120 and the disaster recovery site 110 has been completed. In this embodiment, upon failure of user application(s) 114, since user application(s) 124 is(are) also active user communications will be directed solely to user application(s) 124 through normal load balancing mechanisms. Users would not experience an outage as user application(s) 124 provides(provide) dynamic redundancy. At a convenient time which provides a minimal amount of operational impact, user application(s) 124 is(are) stopped by VIC 150 and user application(s) 134 is(are) restarted by VIC 150 after it directs and verifies storage device 122 at nearby safe site 120 to complete replicating all of its changed data to storage device 132 at disaster recovery site 130.

Figure 3:
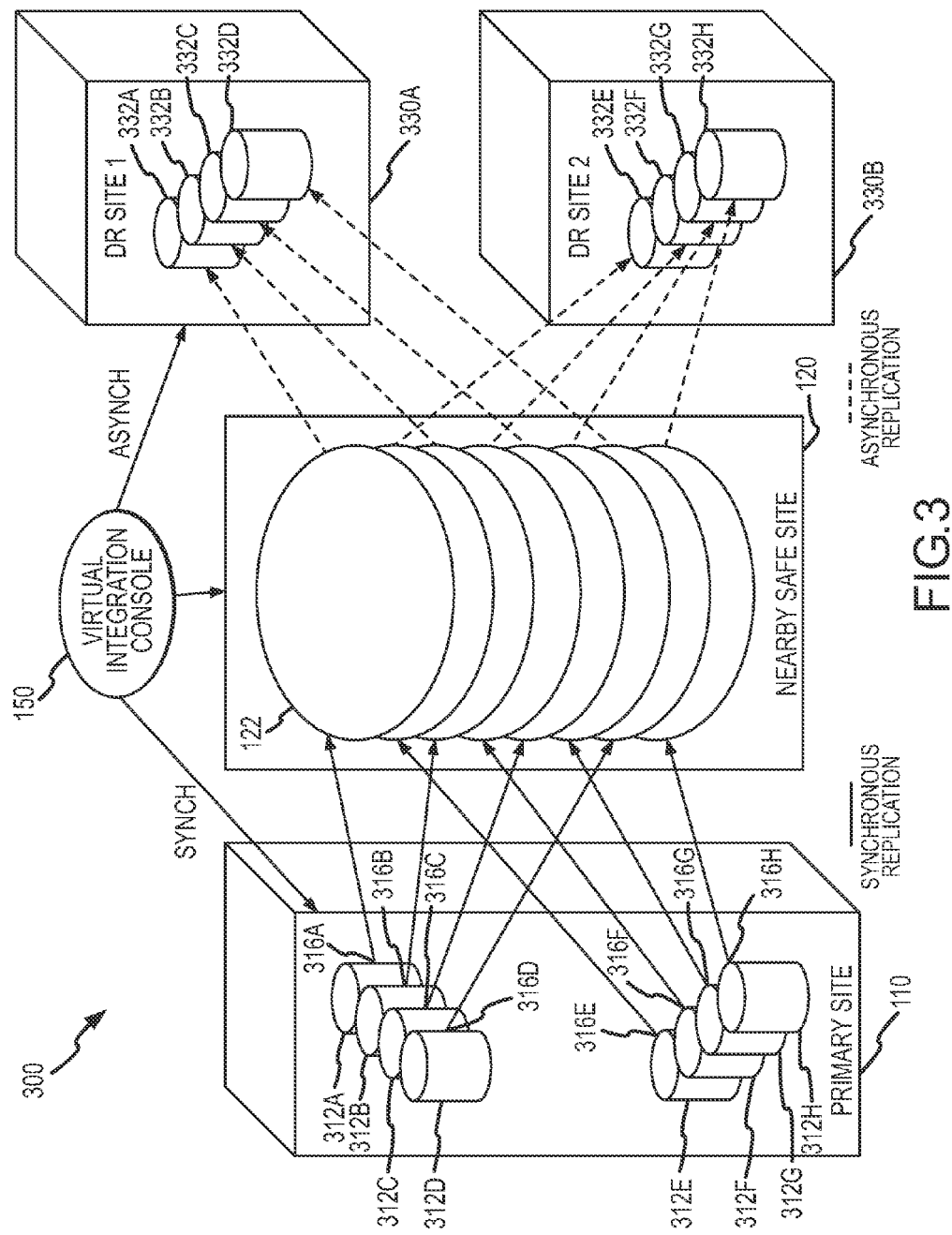
FIG. 3 is block diagram showing one more embodiment of an extended distance data recovery system and the operation thereof in accordance with the present invention.

FIG. 3 shows another embodiment of an extended distance data recovery system 300. The extended distance data recovery system 300 of FIG. 3 includes a number of elements in common with the systems 100, 200 of FIGS. 1 and 2, and corresponding elements are referenced using the same numerals. The primary site 110 in the system 300 of FIG. 3 includes a plurality of first data storage devices 312A-312H each having data 316A-316H stored thereon. The data 316A-316H may be created, updated, and/or accessed by one or more user applications (not shown). The data 316A-316H is synchronously replicated onto the second data storage device (s) 122 at the nearby safe site 120. In this regard, the data 316A-316H may be synchronously replicated at the application level and/or the storage level as previously described in connection with the system 200 of FIG. 2 or the system 100 of FIG. 1. Regardless of the manner in which the data is replicated from the primary site 110 to the nearby safe site 120, data replication is directed by VIC 150.

The first data storage devices 312A-312H may be organized into groups. For example, a first group may include first data storage devices 312A-312D and a second group may include first data storage devices 312E-312H. When the data 316A-316H is asynchronously replicated from the nearby safe site 120, the data 316A-316H may be asynchronously replicated to more than one disaster recovery site. For example, system 300 includes two disaster recovery sites 330A-330B. The data 316A-316D originating from the first group of first data storage devices 312A-312D is replicated to the first disaster recovery site 330A, and the data 316E-316H originating from the second group of first data storage devices 312E-312H is replicated to the second disaster recovery site 330B. In this regard, the first disaster recovery site 330A may include a number of third data storage devices 332A-332D on which the data 316A-316D is replicated, and the second disaster recovery site 330B may include a number of third data storage devices 332E-332H on which the data 316E-

316H is replicated. Regardless of the manner in which the data is replicated from the nearby safe site 120 to the disaster recovery sites 330A-330B, data replication is directed by VIC 150.

As with the systems 100, 200 of FIGS. 1 and 2, VIC 150 monitors operation of the primary site 110, and upon detection of a problem, redirects resources accessing the data 316A-316H to the second data storage device 122 or the third data storage devices 332A-332H as appropriate depending upon whether the asynchronous data replication process between the nearby safe site 120 and the disaster recovery sites 330A-330B has been completed.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. An extended distance data recovery system comprising:
    a first data storage device located at a first site, said first data storage device storing the data thereon;
    a second data storage device located at a second site, said second data storage device being communicatively connected with said first data storage device;
    a third data storage device located at a third site, said third data storage device being communicatively connected with said second data storage device; and
    a computer executable control process executable to direct synchronous replication of the data onto said second data storage device;
    said control process being further executable to direct asynchronous replication of the data from said second data storage device onto said third data storage device, wherein said control process directs the synchronous and asynchronous replication of the data such that the data is initially replicated onto said second data storage device and thereafter replicated from said second data storage device onto said third data storage device with operation of a user application at the first site involving the data being allowed to continue during the asynchronous replication of the data from said second data storage device to said third data storage device;
    at least two independent sets of one or more data storage devices located at said first site, said first data storage device being included in one of said sets, wherein a first one of said sets of one or more data storage devices has a first set of data stored thereon, and wherein a second one of said sets of one or more data storage devices has a second set of data stored thereon;
    a set of one or more data storage devices located at said third site, said third data storage device being included in said set of data storage devices located at said third site; and
    a set of one or more data storage devices located at a fourth site;
    wherein said control process is executable to direct synchronous replication of the first and second sets of data from said first and second sets of one or more data storage devices located at said first site onto said second data storage device located at said second site; and
    wherein said control process is further executable to direct asynchronous replication of the first set of data from said second data storage device located at said second site onto said set of one or more data storage devices located at said third site and asynchronous replication of the second set of data from said second data storage device located at said second site onto said set of one or more data storage devices located at said fourth site.

2. The system of claim 1 wherein the control process directs synchronous replication of the data onto said second storage device at an application level.

3. The system of claim 1 wherein the control process directs synchronous replication of the data onto said second storage device at a data storage level.

4. The system of claim 1, wherein said control process is further executable to monitor an operational status of said first data storage device and, upon occurrence of an event effecting availability of the data from said first data storage device, update location identifying information associated with the data wherein a computer application accesses the data from one of said second site and said third site.

5. The system of claim 1, wherein said third site is geographically separated from said first and second sites, and wherein said second site is geographically separated from said first and third sites.

6. The system of claim 5, wherein a maximum allowable geographical separation distance between said first and second sites varies depending upon application sensitivity to a roundtrip packet delay time between said first and second sites and architectural and operational conditions of a data network connecting said first and second sites.

7. An extended distance data recovery system comprising:
    a first data storage device located at a first site, said first data storage device storing the data thereon;
    a second data storage device located at a second site, said second data storage device being communicatively connected with said first data storage device;
    a third data storage device located at a third site, said third data storage device being communicatively connected with said second data storage device; and
    a computer executable control process executable to direct synchronous replication of the data onto said second data storage device;
    said control process being further executable to direct asynchronous replication of the data from said second data storage device onto said third data storage device, wherein said control process directs the synchronous and asynchronous replication of the data such that the data is initially replicated onto said second data storage device and thereafter replicated from said second data storage device onto said third data storage device with operation of a user application at the first site involving the data being allowed to continue during the asynchronous replication of the data from said second data storage device to said third data storage device;
    wherein said control process is further executable to monitor an operational status of said first data storage device and, upon occurrence of an event effecting availability of the data from said first data storage device, update location identifying information associated with the data wherein a computer application accesses the data from one of said second site and said third site; and
    wherein said control process updates said location identifying information with one or more domain name servers.

8. An extended distance data recovery system comprising:
    a first data storage device located at a first site, said first data storage device storing the data thereon;
    a second data storage device located at a second site, said second data storage device being communicatively connected with said first data storage device;

a third data storage device located at a third site, said third data storage device being communicatively connected with said second data storage device; and a computer executable control process executable to direct synchronous replication of the data onto said second data storage device;

said control process being further executable to direct asynchronous replication of the data from said second data storage device onto said third data storage device, wherein said control process directs the synchronous and asynchronous replication of the data such that the data is initially replicated onto said second data storage device and thereafter replicated from said second data storage device onto said third data storage device with operation of a user application at the first site involving the data being allowed to continue during the asynchronous replication of the data from said second data storage device to said third data storage device;

wherein said third site is geographically separated from said first and second sites, and wherein said second site is geographically separated from said first and third sites; and wherein said first and second sites are geographically separated such that a maximum roundtrip packet delay time over a data network connecting said first and second sites is in the range of 0.5 milliseconds to 10 milliseconds.

9. The system of claim 8, wherein said control process is executable on a computer system located at a fourth site.

10. An extended distance data recovery system comprising:

a first data storage device located at a first site, said first data storage device storing the data thereon;

a second data storage device located at a second site, said second data storage device being communicatively connected with said first data storage device;

a third data storage device located at a third site, said third data storage device being communicatively connected with said second data storage device; and a computer executable control process executable to direct synchronous replication of the data onto said second data storage device;

said control process being further executable to direct asynchronous replication of the data from said second data storage device onto said third data storage device, wherein said control process directs the synchronous and asynchronous replication of the data such that the data is initially replicated onto said second data storage device and thereafter replicated from said second data storage device onto said third data storage device with operation of a user application at the first site involving the data being allowed to continue during the asynchronous replication of the data from said second data storage device to said third data storage device;

wherein said control process is executable on a computer system located at any one or more of said first, second and third sites.

11. An extended distance data recovery system comprising:

a first data storage device located at a first site, said first data storage device storing the data thereon;

a second data storage device located at a second site, said second data storage device being communicatively connected with said first data storage device;

a third data storage device located at a third site, said third data storage device being communicatively connected with said second data storage device; and a computer executable control process executable to direct synchronous replication of the data onto said second data storage device;

said control process being further executable to direct asynchronous replication of the data from said second data storage device onto said third data storage device, wherein said control process directs the synchronous and asynchronous replication of the data such that the data is initially replicated onto said second data storage device and thereafter replicated from said second data storage device onto said third data storage device with operation of a user application at the first site involving the data being allowed to continue during the asynchronous replication of the data from said second data storage device to said third data storage device wherein said control process comprises instances thereof executable on computer systems located at each of said first, second and third sites.

12. A method for providing recovery of data and operational continuity of computer applications accessing the data if an event occurs effecting access to the data on an information technology system, said method comprising the steps of:

storing the data at a first site;

synchronously replicating the data from the first site to a second site, wherein synchronous replication of the data is performed under the direction of a computer executable control process;

asynchronously replicating the data from the second site onto a third site, wherein asynchronous replication of the data is performed under the direction of the control process after synchronous replication of the data to the second site with operation of computer applications at the first site involving the data being allowed to continue during the asynchronous replication of the data from the second site to the third site;

monitoring an operational status of the first site;

updating, upon occurrence of the event, location identifying information associated with the data wherein the computer applications access the data from at least one of the second site and the third site;

storing additional data at the first site;

synchronously replicating the additional data from the first site to the second site, wherein synchronous replication of the additional data is performed under the direction of the computer executable control process; and asynchronously replicating the additional data from the second site to a fourth site, wherein asynchronous replication of the additional data is performed under the direction of the control process.

13. The method of claim 12 wherein said step of synchronously replicating the data from the first site to the second site is performed at an application level.

14. The method of claim 12 wherein said step of synchronously replicating the data from the first site to the second site is performed at a data storage level.

15. The method of claim 12 wherein, in said steps of synchronously replicating and asynchronously replicating, the third site is geographically separated from the first and second sites, and wherein the second site is geographically separated from the first and third sites.

16. The method of claim 15 wherein, in said step of synchronously replicating, a maximum allowable geographical separation distance from the first site and the second site varies depending upon application sensitivity to a roundtrip packet delay time between said first and second sites and architectural and operational conditions of a data network connecting said first and second sites.

17. A method for providing recovery of data and operational continuity of computer applications accessing the data if an event occurs effecting access to the data on an information technology system, said method comprising the steps of:
  storing the data at a first site;
  synchronously replicating the data from the first site to a second site, wherein synchronous replication of the data is performed under the direction of a computer executable control process;
  asynchronously replicating the data from the second site onto a third site, wherein asynchronous replication of the data is performed under the direction of the control process after synchronous replication of the data to the second site with operation of computer applications at the first site involving the data being allowed to continue during the asynchronous replication of the data from the second site to the third site;
  monitoring an operational status of the first site; and
  updating, upon occurrence of the event, location identifying information associated with the data wherein the computer applications access the data from at least one of the second site and the third site
  wherein said updating comprises updating the location identifying information with one or more domain name sewers.

18. A method for providing recovery of data and operational continuity of computer applications accessing the data if an event occurs effecting access to the data on an information technology system, said method comprising the steps of:
  storing the data at a first site;
  synchronously replicating the data from the first site to a second site, wherein synchronous replication of the data is performed under the direction of a computer executable control process;
  asynchronously replicating the data from the second site onto a third site, wherein asynchronous replication of the data is performed under the direction of the control process after synchronous replication of the data to the second site with operation of computer applications at the first site involving the data being allowed to continue during the asynchronous replication of the data from the second site to the third site;
  monitoring an operational status of the first site; and
  updating, upon occurrence of the event, location identifying information associated with the data wherein the computer applications access the data from at least one of the second site and the third site;
  wherein in said step of synchronously replicating, the first and second sites are geographically separated such that a maximum roundtrip packet delay time over a data network connecting the first and second sites is in the range of 0.5 milliseconds to 10 milliseconds.

19. The method of claim 18 further comprising:
  executing the control process on a computer system located at a fourth site.

20. A method for providing recovery of data and operational continuity of computer applications accessing the data if an event occurs effecting access to the data on an information technology system, said method comprising the steps of:
  storing the data at a first site;
  synchronously replicating the data from the first site to a second site, wherein synchronous replication of the data is performed under the direction of a computer executable control process;
  asynchronously replicating the data from the second site onto a third site, wherein asynchronous replication of the data is performed under the direction of the control process after synchronous replication of the data to the second site with operation of computer applications at the first site involving the data being allowed to continue during the asynchronous replication of the data from the second site to the third site;
  monitoring an operational status of the first site;
  updating, upon occurrence of the event, location identifying information associated with the data wherein the computer applications access the data from at least one of the second site and the third site; and
  executing the control process on a computer system located any one or more of said first, second and third sites.

21. A method for providing recovery of data and operational continuity of computer applications accessing the data if an event occurs effecting access to the data on an information technology system, said method comprising the steps of:
  storing the data at a first site;
  synchronously replicating the data from the first site to a second site, wherein synchronous replication of the data is performed under the direction of a computer executable control process;
  asynchronously replicating the data from the second site onto a third site, wherein asynchronous replication of the data is performed under the direction of the control process after synchronous replication of the data to the second site with operation of computer applications at the first site involving the data being allowed to continue during the asynchronous replication of the data from the second site to the third site;
  monitoring an operational status of the first site;
  updating, upon occurrence of the event, location identifying information associated with the data wherein the computer applications access the data from at least one of the second site and the third site; and
  executing instances of the control process on computer systems located at each of said first, second and third sites.

22. A system providing for recovery of data and operational continuity of computer applications accessing the data if an event occurs effecting access to the data on an information technology system, said system comprising:
  means for storing data at a first site;
  means for storing data at a second site;
  means for synchronously replicating the data from the first site to the second site;
  means for storing data at a third site;
  means for asynchronously replicating the data from the second site onto the third site, wherein said means for asynchronously replicating the data asynchronously replicate the data from the second site onto the third site after synchronous replication of the data to the second site with operation of computer applications at the first site involving the data being allowed to continue during the asynchronous replication of the data from the second site to the third site;
  means for monitoring an operational status of the first site and updating, upon occurrence of the event, location identifying information associated with the data wherein the computer applications access the data from at least one of the second site and the third site;
  means for storing additional data at the first site, wherein said means for synchronously replicating are also for synchronously replicating the additional data onto said means for storing data at the second site; and
  means for storing data at a fourth site, wherein said means for asynchronously replicating are also for asynchronously replicating the additional data from said means for storing data at the second site to said means for storing data at the fourth site.

23. The system of claim 22 wherein said means for storing data at a first site comprise a first data storage device, said means for storing data at a second site comprise a second data storage device, and said means for storing data at a third site comprise a third data storage device.

24. The system of claim 22 wherein said means for synchronously replicating the data, said means for asynchronously replicating the data, and said means for monitoring comprise a computer executable control process.

25. The system of claim 22 wherein said means for synchronously replicating the data from the first site to the second site replicate the data at an application level.

26. The system of claim 22 wherein said means for synchronously replicating the data from the first site to the second site replicate the data at a data storage level.

27. The system of claim 22, wherein the third site is geographically separated from the first and second sites, and wherein the second site is geographically separated from the first and third sites.

28. The system of claim 27, wherein a maximum allowable geographical separation distance between the first and third sites varies depending upon application sensitivity to a roundtrip packet delay time between said first and second sites and architectural and operational conditions of a data network connecting said first and second sites.

29. A system providing for recovery of data and operational continuity of computer applications accessing the data if an event occurs effecting access to the data on an information technology system, said system comprising:

means for storing data at a first site;
means for storing data at a second site;
means for synchronously replicating the data from the first site to the second site;
means for storing data at a third site;
means for asynchronously replicating the data from the second site onto the third site, wherein said means for asynchronously replicating the data asynchronously replicate the data from the second site onto the third site after synchronous replication of the data to the second site with operation of computer applications at the first site involving the data being allowed to continue during the asynchronous replication of the data from the second site to the third site; and
means for monitoring an operational status of the first site and updating, upon occurrence of the event, location identifying information associated with the data wherein the computer applications access the data from at least one of the second site and the third site;
wherein the third site is geographically separated from the first and second sites, and wherein the second site is geographically separated from the first and third sites; and
wherein said first and second sites are geographically separated such that a maximum roundtrip packet delay time over a data network connecting the first and second sites is in the range of 0.5 milliseconds to 10 milliseconds.

* * * * *